United States Patent [19]
Rao et al.

[11] Patent Number: 6,055,065
[45] Date of Patent: Apr. 25, 2000

[54] PRINTER INDEPENDENT HALFTONE IMAGE RENDERING

[75] Inventors: Ravishankar Rao, White Plains; Gerhard Robert Thompson, Wappingers Falls; Charles P. Tresser, Mamaroneck; Chai Wah Wu, Ossining, all of N.Y.

[73] Assignee: International Business Machines Corporation, Armonk, N.Y.

[21] Appl. No.: 09/132,881

[22] Filed: Aug. 12, 1998

[51] Int. Cl.[7] ................................................. G06F 15/00
[52] U.S. Cl. ........................................ 358/1.9; 358/1.13
[58] Field of Search ........................ 358/1.9, 1.15, 358/1.13, 1.1, 1.2, 534, 535, 536, 455, 456, 457, 459, 298, 504, 527, 530, 406, 429, 458, 518, 1.4, 1.18, 1.8; 382/181, 190, 195, 209, 217, 162, 165

[56] References Cited

U.S. PATENT DOCUMENTS

| | | | |
|---|---|---|---|
| 5,271,096 | 12/1993 | Cook | 358/1.9 |
| 5,323,249 | 6/1994 | Liang | 358/518 |
| 5,572,632 | 11/1996 | Laumeyer et al. | 358/1.2 |
| 5,636,330 | 6/1997 | Barak | 358/1.9 |
| 5,710,824 | 1/1998 | Mongeon | 382/162 |
| 5,943,477 | 8/1999 | Rao et al. | 358/1.8 |
| 5,946,455 | 8/1999 | Tresser et al. | 358/1.9 |

*Primary Examiner*—Dov Popovici
*Attorney, Agent, or Firm*—Whitham, Curtis & Whitham; Stephen C. Kaufman, Esq.

[57] ABSTRACT

A method and apparatus for matching the print outputs of two printers having different characteristics. For the purpose of laser printing, or more generally for reproduction on any printing device with limited number of printing levels, a color or grayscale image has to be transformed into an array of printing decisions at each pixel of the output image. Sometimes this array is the only available representation of the original image. One may desire to print this array on a printer with different characteristics from the printer for which the array was originally prepared. The method and apparatus solve this problem by generating a printing decision matrix which takes into account the differences between the two printers.

10 Claims, 3 Drawing Sheets

PRINTER INDEPENDENT HALFTONE IMAGE RENDERING

BACKGROUND OF THE INVENTION

1. Field of the Invention

The present invention is directed to a method and apparatus for matching the print outputs of two printers which have different printer characteristics so that the output images of the printers are visually close in appearance.

2. Background Description

Most printers today can print in only a limited number of colors. Digital halftoning is a technique for printing a picture (or more generally displaying it on some two-dimensional medium) using small dots with a limited number of colors such that it appears to consist of many colors when viewed from a proper distance. For example, a picture of black and white dots can appear to contain grey levels when viewed from some distance. For purposes of simplicity, the rest of the discussion will be restricted to the case of grayscale images and their rendering by black and white printers to facilitate the presentation; however, anyone versed in the art of digital halftoning should know how to adapt the present invention to color images. When we speak of ink, it could mean any material and/or mechanism which produces the black in the image, i.e., it could be toner for a xerographic printer, ink for an inkjet printer, etc.

We will be concerned with bilevel, fixed pixel size printers (for instance laser printers). Such printers have two fundamental characteristics:

1) The print resolution, say d dpi (dots per inch), which can be interpreted as saying that the intended fundamental units of the print are arranged on a grid of squares with each square or pixel of size 1/d inches by 1/d inches, where d typically varies from about 300 to about 3000. In some cases, the pixels lie on a rectangular grid, but the discussion adapts equally well to this case, so we will always assume square pixels for definiteness.

2) The dot gain which tells us how the actual printed pixel (or dot) differs from a perfect 1/d by 1/d square in shape and size (notice that in previous sentences, the word "dot" was used in a loose sense). While many printers perform differently, standard theory and much of the prior art on calibration assumes that printers print dots which can be reasonably described as round, say with diameter D (or as an ellipse in the case of a rectangular grid), and the dot gain is often described accordingly.

In the sequel, we make the assumption that no printed dot goes beyond a circle with diameter 2/d centered at the middle of the pixel where it is intended to be printed (a circular dot which covers an entire 1/d by 1/d square has diameter at least $\sqrt{2}/d$ ). This assumption is made to simplify the discussion and in particular the description of the invention. Adaptation to a more general case is tedious to describe but not difficult to implement by anyone skilled in the art of digital printing.

While standard theory assumes that printed dots are reasonably described as round, say with diameter D, many printers perform differently. As taught in the invention disclosed in U.S. patent application Ser. No. 09/085,094 filed on May 26, 1998, now U.S. Pat. No. 5,943,477, issued Aug. 24, 1999, by A. R. Rao, Gerhard R. Thompson, Charles P. Tresser and Chai Wah Wu for "Microlocal Calibration of Digital Printers", both the probabilistic nature of individual dot printing and the way printing neighboring dots in various configurations affects the dot shapes can be captured by a calibration method. This method characterizes a printer by the probability distribution of what area of ink gets printed at each pixel depending on the configuration of dots to be printed in the neighborhood of that pixel. Here we use the word "ink" as a generic name for what gets printed, such as ink or toner. In the sequel, whenever we speak of printer characteristic, we mean the characteristic as given by the calibration method as disclosed in U.S. patent application Ser. No. 09/085,094, now U.S. Pat. No. 5,943,477, issued Aug. 24, 1999, except when otherwise specified. The probabilistic nature of such printer characterization means in particular that the notation "fixed pixel size" for a printer refers to its idealized properties rather than to actual ones.

Consider now some grayscale image to be printed with a digital printer. We assume that the image is of size h by v, where h and v are expressed in inches to be consistent with the unit used in the dpi description. It is then convenient to interpret this image as a matrix I of size H=h×d by V=v×d in the following way:

One thinks of the image as covered by little squares of size 1/d by 1/d (also called pixels).

Each pixel p, can be designated by its horizontal ordering number i (say from left to right) and its vertical ordering number j (say from top to bottom). Thus, the location of p is specified by the pair (i,j).

To the pixel at (i,j) one assigns the value g between 0 and 1, where 0 corresponds to white, 1 corresponds to black, and more generally, g corresponds to the grey level of this particular pixel.

The matrix I is then defined by setting I(i,j)=g.

Given a matrix such as I, a digital halftoning algorithm will associate to it an H by V halftone matrix M whose entries M(i,j) are either 0 or 1. Now 0 means that no dot will be printed by the digital printer at pixel (i,j), while a 1 means that a dot is to be printed.

A grayscale image can thus be thought of as an array I of B-bit numbers, where typically B ranges from 4 to 12. Because M is an array of single bits of the same size as I, straightforward storage of M instead of I represents a factor B in compression. It often happens that the original grayscale image I is not available and only the halftone (or printing decision) matrix M is retained. Usually, because different printers have different characteristics, a given M will produce different images when used with two different printers. This invention will disclose a method to overcome this problem.

Problems to be Solved

Assume some bilevel fixed pixel size printer, P, has been chosen to print the image. A halftoning algorithm generates the printing decision matrix M and the printer uses matrix M to print a halftoned version of input image I. The printed halftoned version of input image I is denoted by N, which can be understood as an H by V matrix of numbers between 0 and 1. Each entry in the matrix represents the average darkness in the corresponding 1/d×1/d square of the printed output. The printed image N is determined by the matrix M and the printer P. If one uses matrix M to print with another printer P', the resulting printed image N', now determined by matrix M and P', will in general be different from printed image N. In case input image I is unavailable and only matrix M is known, the problem to be solved is to generate a printed image N' as close to printed image N as possible, given decision matrix M and the printer characteristics of both the printers P and P'. We solve this problem by generating a printing decision matrix M' which will take account of the differences between printers P and P'. In other words, using decision matrix M' constructed with the method we disclose, the printer P' will print an image N' which is close to printed image N.

SUMMARY OF THE INVENTION

It is therefore an object of the present invention to provide a method and apparatus for matching the print outputs from two printers having different printer characteristics.

According to the invention, there is provided a two stage approach to the problem to be solved; the first stage is called either modeling or fitting (depending on how much is known about P), and the second stage is called realization. The modeling consists of computing, for each pair (M,P) formed by a printing decision matrix M and a printer P with some known printer characteristics, an approximation $N_1$ to the matrix N. $N_1$ can be interpreted as a grayscale image. The matrix N corresponds to the actual printed page, whereas the matrix $N_1$ corresponds to the simulated appearance of the page as computed from our model. The realization consists of the computation of M' as the printing decision matrix determined by the grayscale image $N_1$ (which can be viewed as a substitute for the image I) and the printer characteristics of some printer P'. The pair (M',P') generates some image N', which can be modeled by some $N'_1$ by the same modeling method used for the pair (M,P). The computed M' generates $N'_1$ which is close to $N_1$. If the printer characteristic of P is unknown or partially known, one uses fitting before the modeling stage. In this case the printer characteristic of P is first approximated by some fitting algorithm. The modeling stage as described before then follows.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
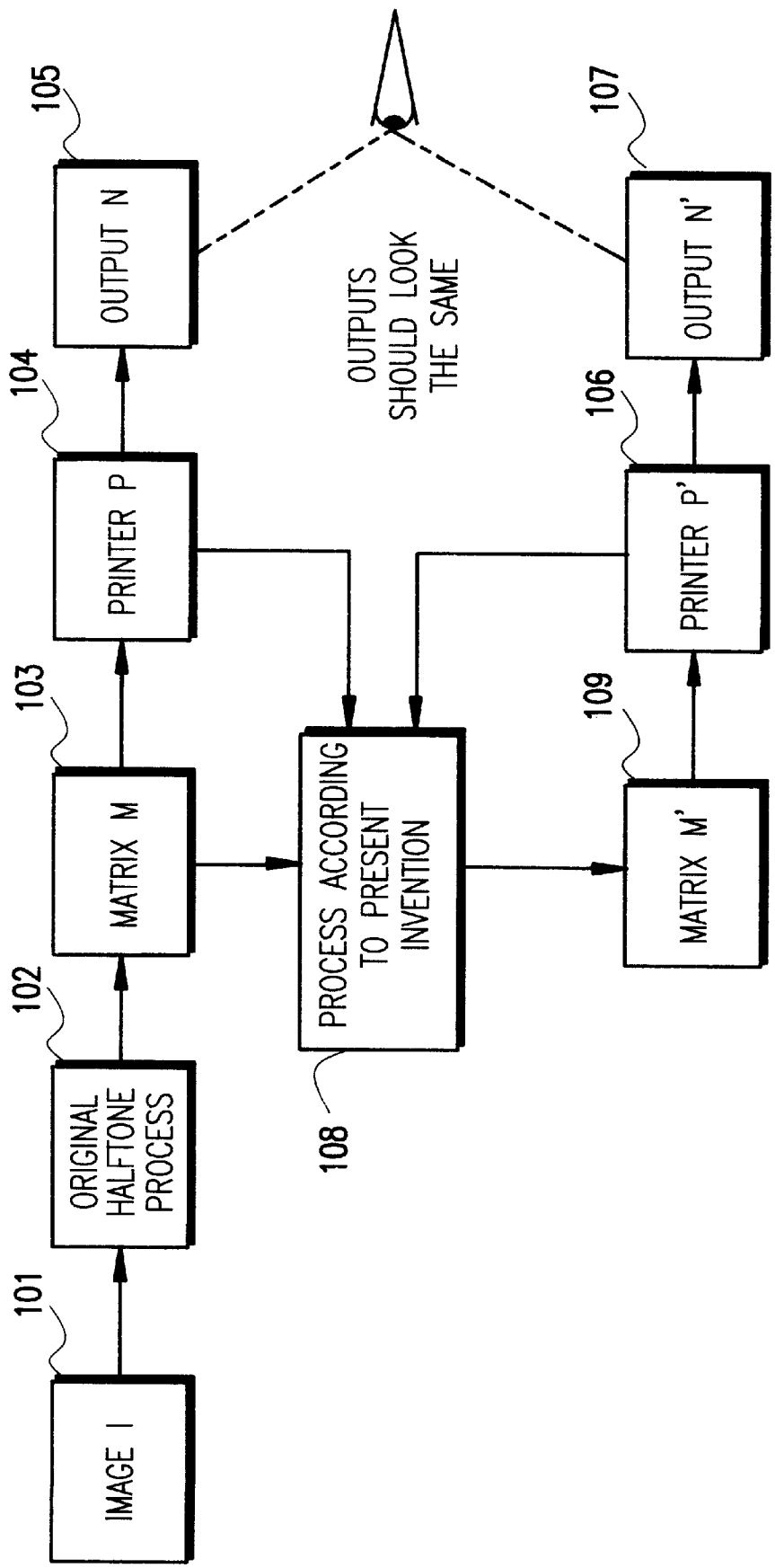
FIG. 1 is a block diagram illustrating the problem scenario in which two printers generate respective outputs that should look the same.

Referring now to the drawings, and more particularly to FIG. 1, there is shown a block diagram of the problem scenario to illustrate the problem solved by the invention. An input image I, denoted 101, is input to a halftone process 102 to generate a printer decision matrix M, denoted 103. A bilevel fixed pixel size printer P, denoted 104, prints the image N, denoted 105, using matrix M to print a halftoned version of input image I. The printed image N is determined by the matrix M and the printer P.

Now if the matrix M 103 to print with another printer P', denoted as 106, the resulting printed image N' 107, now determined by matrix M and printer P' 106, will in general be different from printed image N 105. In case input image I 101 is unavailable and only matrix M 103 is known, the problem solved by this invention is to generate a printed image N' 107 as visually close to printed image N 105 as possible, given decision matrix M 103 and the printer characteristics of both the printers P 104 and P' 106.

The process according to the invention, denoted 108, generates a printing decision matrix M' 109 which will take account of the differences between printers P 104 and P' 106. Using decision matrix M' 109 constructed with the process 108, the printer P' 106 will print an image N' 107 which is visually close to printed image N 105. The process 108 uses a two stage approach; the first stage is called either modeling or fitting (depending on how much is known about P), and the second stage is called realization.

Modeling Stage

The amount of ink being printed at location (i,j) is described by probability distributions depending on the local configuration of dots scheduled to be printed by the matrix M in some neighborhood $U_1$ of (i,j). Thus the printer characteristic, together with the matrix M, allows one to approximate the matrix $N_1$ as we shall next explain. Let J(M,P)(i,j) be the H by V matrix which is zero at each entry except at (i,j) where it is equal to the proportion of the pixel (i,j) to be covered by ink according to M and the printer characteristics. Then $N_1$ can be approximated by the sum of all the matrices $J(M,P)_{(i,j)}$.

The above general description includes in particular the simplest case where dots are modeled by round dots with constant diameter. Using this common model of a deterministic round dot with diameter D, one can proceed as above after using simple geometric data to reconstruct the printer characteristics. As a result, the probabilistic aspect disappears but the local configuration dependence remains. As an intermediate between a complete printer characterization and a single diameter round dot model, one can also use a variable diameter round dot model. In this case the diameter either depends on the local configuration, which brings us to a formulation almost equivalent to the characterization which incorporates a probabilistic component, or depends more simply on the local density, in which case one can vary the dependance by adjusting a curve (the graph of diameter versus density). Then a probabilistic aspect can be introduced (dots might not print at low density), in the form of a second graph.

Figure 2:
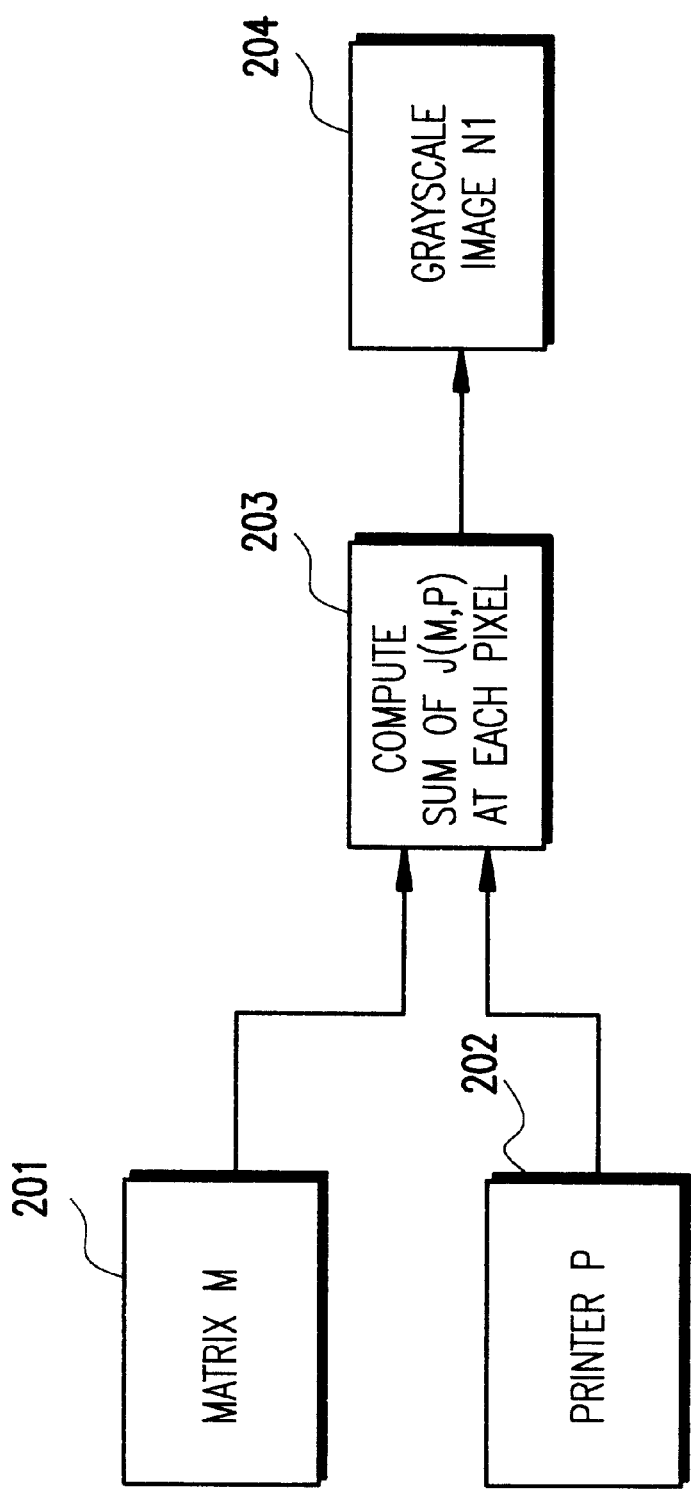
FIG. 2 is a block diagram of the modeling stage according to the invention.

In general, this invention can be adapted to any defined printer characterization of a printer and the modeling step can be implemented as follows, with reference to FIG. 2. Using the halftone matrix M at 201 and the characteristics of the printer P at 202, one computes at 203 the amount $J(M,P)_{(i,j)}$ of ink to be deposited at each pixel (i,j). The array of these amounts together form the matrix $N_1$ at 204, which is an approximation of the image N printed by P when inputting the matrix M.

Realization Stage

Once $N_1$ has been computed, one could consider it as an arbitrary grayscale image, and proceed with any halftoning method to compute M', and thereby N'. However, it is well known that no digital halftoning method which is not computationally intensive can give satisfactory results for all grayscale images. Now N, as well as $N_1$, are quite peculiar in the way they are obtained from a halftoned image. In particular, it is easy to check that dithering methods will not work if the resolutions are equal (d'=d), and both P and P' print round dots with respective diameters D and D', and D'=D. To the contrary, good results will be obtained by using error diffusion. More precisely, as discussed for instance in "Measurement of Printer Parameters for Model-based Halftoning", J. El. Imag., 2(3) (1993) 193–204, by T. N. Pappas, C. K. Dong, and D. I. Neuhoff or in "Measurement based Evaluation of a Printer Dot Model for Halftone Algorithm Tone Correction", *J. El. Imag.*, 2(3) (1993) 205–212, by C. J. Rosenberg, the results will be even better if, instead of using calibration, one uses an error diffusion method which takes account of the dot gain. Such model-based error diffusion methods are described for instance in "Printer Models and Error Diffusion", *IEEE Transactions on Image Processing*, 4(1) (1995) 6680, by T. N. Pappas and D. L. Neuhoff, in "A modified error-based error diffusion" *IEEE Signal Processing Letters*, 4(2) (1997) 36–38, by Y. Lin and T. C. Ko, or in U.S. patent application Ser. No. 08/942,624 filed Oct. 2, 1997, now U.S. Pat. No. 5,946,455, issued Aug. 31, 1999, by Charles P. Tresser and Chai Wah Wu for "Model Based Error Diffusion with Correction Propagation".

Figure 3:
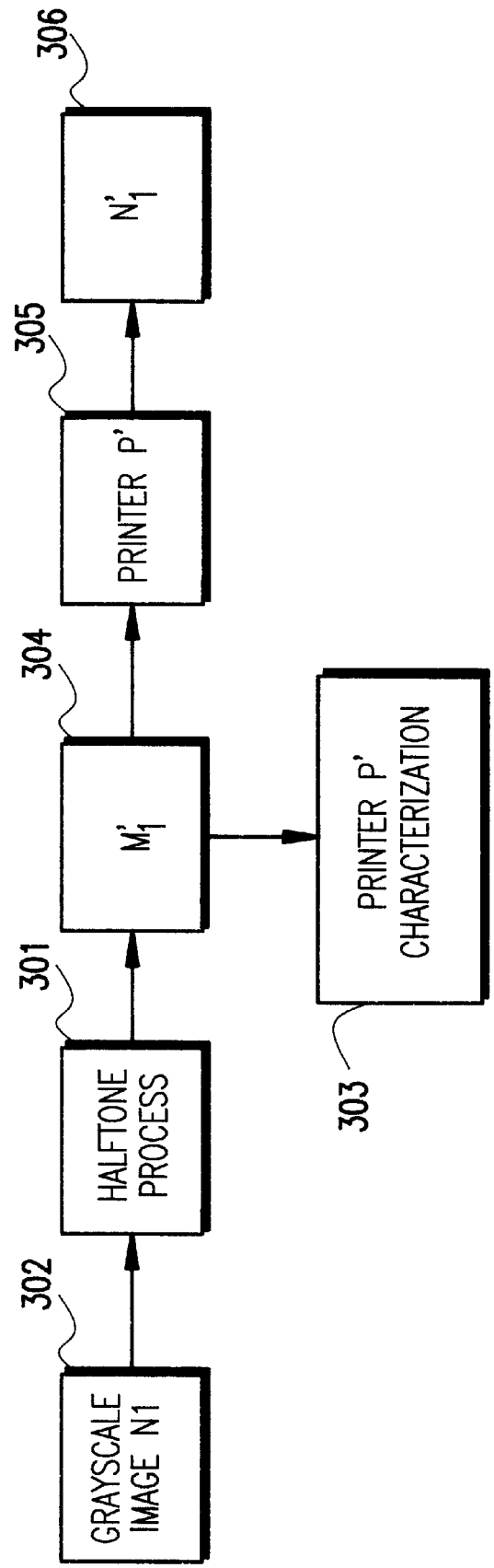
FIG. 3 is a block diagram of the realization stage according to the invention.

The last method is the one with the most complete compensation for dot gain. That method can in fact easily accommodate complex and realistic models for printer characteristics. Thus, we use this method, suitably modified, the realization stage of the method is described with reference to FIG. 3. Once a halftone process has been chosen at 301, the matrix $N_1$ interpreted as a grayscale image at 302, is processed at 301 taking into account the printer characteristics of printer P' at 303. This results in the halftone matrix $M'_1$ at 304. The matrix $M'_1$ is then sent to the printer P' at 305, which outputs the image $N'_1$ at 306.

Fitting Stage

If the printer P is not available (so that the printer characteristic cannot be measured), a model of printer P is first determined before the Modeling stage. This is the purpose of the Fitting stage. For example, one can choose a round dot model as a model for printer P. If pairs (M,N) produced by printer P are available, using a fine scanner or another form of measurement such as a densitometer, one can fit a density dependent round dot diameter, including probabilistic data, much easier than one could produce a configuration dependant diameter function. How to do so should be obvious to anyone trained in the art. For example, characterization of the printer output may be done by an h×v local neighborhood, such as a 3×3 neighborhood, where the reflectivity of the combination of various bit patterns in the neighborhood is measured by a densitometer. Once the diameter function has been determined, one proceeds as in the modeling stage. If only M is available, the fit of P can only be attained by trials followed by realizations as described next. This can be done by first assuming a round dot with constant diameter, and then adjusting from there. The process can be long and tedious but in the most important case when several images are kept in the M form, the adequate model for P, once determined, can serve for the entire collection. Again, once the diameter function has been determined, one proceeds as in the modeling stage.

Those versed in the art of printing will readily understand how to adapt the discussion and the invention to color images and color printing. Notice that, because of the way the human eye perceives color, the pixel by pixel solution which constitutes the present invention is not necessarily preferable to spectral approaches when it comes to polychrome images, but might be preferable in some instances. Thus, while the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An apparatus for matching print outputs from two printers having different characteristics comprising:

first and second printers;

a first printing decision matrix generated by a halftone process, the first printer producing a first output image in response to the first printing decision matrix; and a second printing decision matrix generated by a process which receives as inputs an output of the first printing decision matrix and printer characteristics of each of the first and second printers, the second printer producing a second output image in response to the second printing decision matrix, said first and second output images being visually close in appearance.

2. The apparatus for matching the print outputs from two printers having different characteristics as recited in claim 1 further comprising a measurement device to measure the reflectivity of printed dots on paper wherein the process which generates the second printing decision matrix transforms instructions for printing on the first printer into a new set of instructions for printing on the second printer such that the printed output from the second printer is close in appearance to the output of the first printer.

3. The apparatus for matching the print outputs from two printers having different characteristics as recited in claim 2 wherein the measurement device is a densitometer.

4. The apparatus for matching the print outputs from two printers having different characteristics recited in claim 2 wherein the measurement device measures printer output in an h×v local neighborhood by measuring a reflectivity pattern of a combination of various bit patterns in the neighborhood.

5. The apparatus for matching the print outputs from two printers having different characteristics recited in claim 2 wherein the process which generates the second printing decision matrix creates an intermediate gray level image by substituting bit patterns of an original halftone image from the first printer with gray levels from a fimction of measured reflectivity of the first printer.

6. The apparatus for matching the print outputs from two printers having different characteristics recited in claim 5 wherein the resulting gray level image is re-halftoned with a technique whose tone reproduction characteristic is calibrated with respect to the second printer.

7. A method for matching print outputs from first and second printers having different characteristics comprising the steps of:

generating a first printing decision matrix by a first halftone process, the first printer producing a first output image in response to the first printing decision matrix;

measuring a reflectivity of a reflectivity of printed dots on paper output from the first printer;

generating a second printing decision matrix by a second halftone process where instructions from printing on the first printer are transformed into a new set of instructions for printing on the second printer such that a printed output from the second printer is visually close in appearance to a printed output of the first printer.

8. The method for matching the print outputs from first and second printers having different characteristics recited in claim 7 wherein the step of measuring measures printer output in an h×v local neighborhood by measuring a reflectivity pattern of a combination of various bit patterns in the neighborhood.

9. The method for matching the print outputs from first and second printers having different characteristics recited in claim 7 wherein the step of generating the second printing decision matrix creates an intermediate gray level image by substituting bit patterns of an original halftone image from the first printer with gray levels from a function of measured reflectivity of the first printer.

10. The method for matching the print outputs from first and second printers having different characteristics recited in claim 9 further comprising the step of rehalftoning the resulting gray level image with a technique whose tone reproduction characteristic is calibrated with respect to the second printer.

* * * * *